No. 889,707. PATENTED JUNE 2, 1908.
H. A. METT.
HALTER ROPE.
APPLICATION FILED MAY 1, 1907.

Inventor
Henry A. Mett.

Witnesses
F. C. Gibson.
C. Bradway.

By Victor J. Evans
Attorney

UNITED STATES PATENT OFFICE.

HENRY AUGUST METT, OF MAPLES, NEW YORK.

HALTER-ROPE.

No. 889,707.  Specification of Letters Patent.  Patented June 2, 1908.

Application filed May 1, 1907. Serial No. 371,343.

*To all whom it may concern:*

Be it known that I, HENRY AUGUST METT, a citizen of the United States, residing at Maples, in the county of Cattaraugus and State of New York, have invented new and useful Improvements in Halter-Ropes, of which the following is a specification.

This invention relates to a halter rope for horses, cows and the like of that type provided with devices whereby the rope can be formed into a loop to engage around the horns of a cow or the neck of a horse without danger of loosening or slipping.

The invention has for one of its objects to improve and simplify the construction and operation of devices of this character so as to be comparatively easy and inexpensive to manufacture, thoroughly reliable and efficient in use and are designed so that a horse or cow can be quickly and readily haltered or unhaltered, even though the fingers be cold or mittens are worn.

A further object of the invention is the provision of a halter rope having a wire hook of spiral form at one end which is adapted to engage over the rope to form the halter loop and coöperating therewith is an anti-slipping member which holds firm on draft being applied to the halter rope, but which can be readily adjusted by hand to lengthen or shorten the halter loop.

With these objects in view and others as will appear as the description proceeds, the invention comprises the various novel features of construction and arrangement of parts which will be more fully described hereinafter and set forth with particularity in the claims appended hereto.

Figure 1:
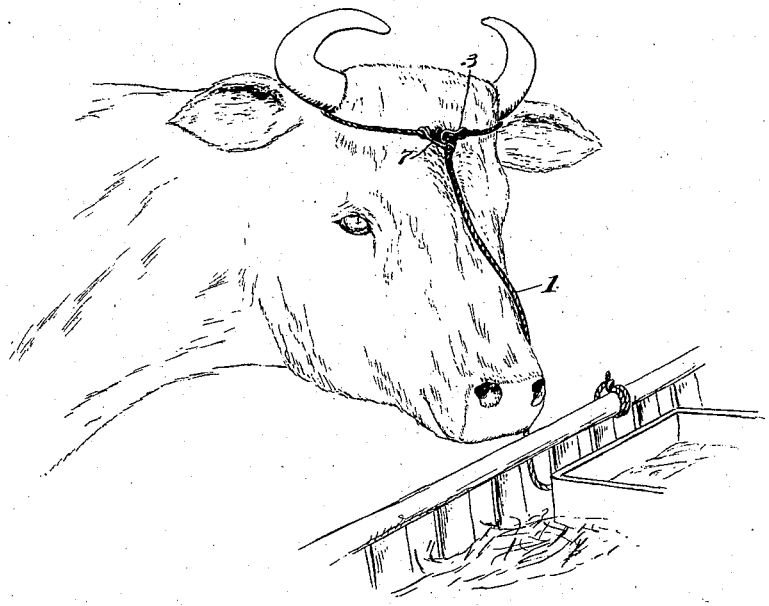
Figure 1:
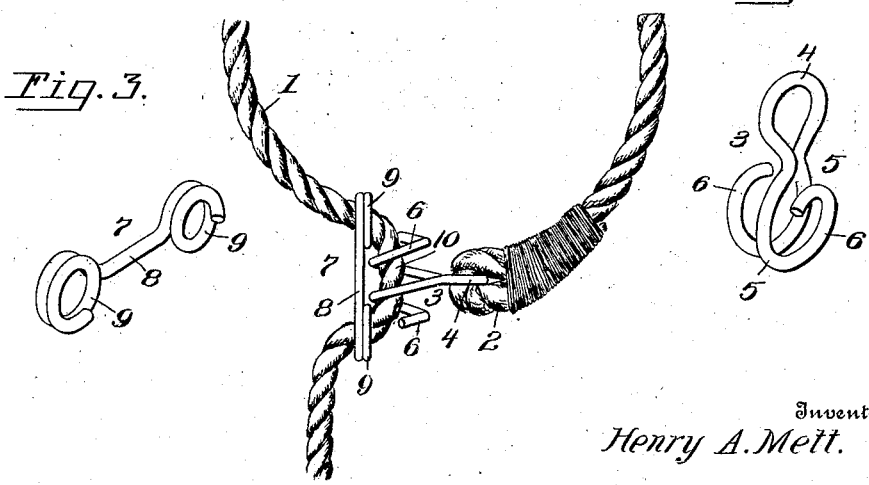

In the accompanying drawings which illustrate one of the embodiments of the invention, Figure 1 is a perspective view of the halter, shown applied to a cow. Fig. 2 is an enlarged detail view of a portion of the halter rope showing the loop holding means. Fig. 3 is a perspective view of the anti-slipping member. Fig. 4 is a perspective view of the terminal hook of the halter rope.

Similar reference characters are employed to designate corresponding parts throughout the several views.

Referring to the drawing 1 designates a halter rope of suitable diameter which has at one end a loop 2 for holding the hook device designated generally by 3. This device comprises a piece of wire of suitable gage for the requisite stiffness and strength which is doubled centrally on itself to form an eye 4 and arms 5 that are each formed of a short spiral-like hook 6. These hooks are adapted to be engaged over the rope 1 so as to form the halter loop to go around the neck of the horse or horns of a cow, as shown in the present instance. In order to prevent the hook device from slipping along the rope under any draft exerted on the latter by the animal, an anti-slipping device, designated generally by 7, is employed. This comprises a piece of wire formed into a central bar 8 and provided with eyes or coils 9 at its ends through which the rope 1 is threaded. This device serves to hold the rope in a partial loop, as indicated at 10, and the hook 3 is engaged on the rope 1 at this looped portion and when a pull is exerted on the rope, as by an animal moving backward in its stall while the halter is hitched to the manger, the hook 3 will not slip since the device 7 serves as an anti-slipping or locking device. The device 7 is free, however, to be adjusted along the rope for the purpose of making a larger or smaller halter loop, as desired, and when the halter is applied, the parts will have a greater holding effect as the draft becomes tighter, so that slipping is positively prevented. In the present instance, the hook and anti-slipping device have been applied to only one end of the halter rope, but it is obvious that the same may be used for the end that is attached to the manger of a stall.

In practice, the anti-slipping device is adjusted along the rope to the proper point and then the end of the rope having the hook 3 is passed over the neck of the horse or cow or around the horns of the latter and the hook engaged over the rope at the portion between the ends of the anti-slipping device. This engagement can be effected in a simple manner and after once being engaged, the size of the halter loop can not change, thus preventing the choking of the animal. The hook 3 can be as readily detached when it is desired to move the halter and this advantage is of importance since one can use the device with cold hands or while mittens are worn.

From the foregoing description taken in connection with the accompanying drawing, the advantages of the construction and of the method of operation will be readily apparent to those skilled in the art to which the invention appertains, and while I have described the principles of operation of the invention, together with the device which I now consider to be the best embodiment thereof, I desire to have it understood that the device shown is merely illustrative and that such changes may be made when desired as are within the scope of the claims.

Having thus described the invention, what is claimed as new is:

1. A halter comprising a rope, a hook secured to one end of the rope and consisting of a single piece of metal doubled centrally on itself to form an attaching eye and having its extremities bent into helical coils extending into opposite directions and having their adjacent convolutions permanently spaced apart a distance equal to the thickness of the rope, the diameter of each coil being greater than the diameter of the rope for permitting free movement of the latter, and an adjustable member on the rope for coöperating with the said hook to prevent slipping of the latter.

2. A halter comprising a rope, a device attached to one end thereof, and provided with oppositely disposed hooks, and a second device on the rope coöperating with the first device for preventing slipping of the latter along the rope.

3. A halter comprising a rope or the like, a hook device attached to one end thereof and comprising a length of wire bent into an eye and having oppositely disposed spiral shaped hooks adapted to be engaged with the body portion of the rope and means permanently attached to the rope for preventing the hooks from slipping along the same.

4. A halter comprising a rope or the like, a hook device permanently attached thereto and provided with oppositely disposed engaging hooks and an anti-slipping device comprising a single length of wire bent into a bar portion and terminal eyes through which the rope is passed.

In testimony whereof, I affix my signature in presence of two witnesses.

HENRY AUGUST METT.

Witnesses:
 EDWIN DWIGHT NORTHRUP,
 CHARLES NORTHRUP.